United States Patent
Litvinov et al.

(10) Patent No.: US 8,537,234 B2
(45) Date of Patent: Sep. 17, 2013

(54) IMAGE RESTORATION WITH ENHANCED FILTERING

(75) Inventors: Anatoly Litvinov, Binyamina (IL); Yoav Lavi, Ra'anana (IL); Uri Kinrot, Hod Hasharon (IL)

(73) Assignee: DigitalOptics Corporation International, San Jose, CA (US)

( * ) Notice: Subject to any disclaimer, the term of this patent is extended or adjusted under 35 U.S.C. 154(b) by 295 days.

(21) Appl. No.: 12/599,257

(22) PCT Filed: May 6, 2008

(86) PCT No.: PCT/IL2008/000622
§ 371 (c)(1),
(2), (4) Date: Oct. 21, 2010

(87) PCT Pub. No.: WO2008/135995
PCT Pub. Date: Nov. 13, 2008

(65) Prior Publication Data
US 2011/0032392 A1      Feb. 10, 2011

Related U.S. Application Data

(60) Provisional application No. 60/928,254, filed on May 7, 2007, provisional application No. 60/928,255, filed on May 7, 2007.

(51) Int. Cl.
*H04N 5/228*     (2006.01)
(52) U.S. Cl.
USPC ........ 348/222.1; 348/241; 382/255; 382/263; 382/266; 382/279

(58) Field of Classification Search
USPC .............. 348/241, 208.4, 222.1, 223.1, 167; 382/255, 263, 106, 266
See application file for complete search history.

(56) References Cited

U.S. PATENT DOCUMENTS

| | | | |
|---|---|---|---|
| 2003/0059117 A1* | 3/2003 | Iwasa et al. | 382/224 |
| 2006/0013479 A1 | 1/2006 | Trimeche et al. | |
| 2007/0030381 A1* | 2/2007 | Maeda | 348/345 |
| 2007/0035706 A1 | 2/2007 | Margulis | |
| 2010/0080487 A1* | 4/2010 | Yitzhaky et al. | 382/266 |

FOREIGN PATENT DOCUMENTS
WO      WO2004063989 A2 *    7/2004

OTHER PUBLICATIONS

International Preliminary Report (IPER) dated Dec. 10, 2009 for International PCT application No. PCT/IL2008/000622 (consisting of 8 pages) including Written Opinion from ISA.

* cited by examiner

*Primary Examiner* — Sinh Tran
*Assistant Examiner* — Paul Berardesca
(74) *Attorney, Agent, or Firm* — Hickman Palermo Truong Becker Bingham Wong LLP

(57) ABSTRACT

A method for imaging includes receiving an input image that includes a matrix of pixels (32) having input pixel values. The input pixel values are processed so as to detect a region of saturation in the input image. A first image filtering operation is applied to the input pixel values of at least the pixels that are outside the region of saturation, so as to generate first filtered pixel values. A second image filtering operation is applied to the input pixel values of at least the pixels that are within the region of saturation, so as to generate second filtered pixel value. An enhanced output image is generated by stitching together the first and second filtered pixel values.

30 Claims, 5 Drawing Sheets

IMAGE RESTORATION WITH ENHANCED FILTERING

CROSS-REFERENCE TO RELATED APPLICATIONS

This application claims the benefit of U.S. Provisional Patent Applications 60/928,254 and 60/928,255, both filed May 7, 2007, which are incorporated herein by reference.

FIELD OF THE INVENTION

The present invention relates generally to digital imaging, and specifically to methods and devices for enhancing image quality in digital cameras and other digital imaging systems.

BACKGROUND OF THE INVENTION

The objective optics used in digital cameras are typically designed so as to minimize the optical point spread function (PSF) and maximize the modulation transfer function (MTF), subject to the limitations of size, cost, aperture size, and other factors imposed by the camera manufacturer. The PSF of the resulting optical system may still vary from the ideal due to focal variations and aberrations. A number of methods are known in the art for compensating for such PSF deviations by digital image processing.

For example, U.S. Pat. No. 6,154,574, whose disclosure is incorporated herein by reference, describes a method for digitally focusing an out-of-focus image in an image processing system. A mean step response is obtained by dividing a defocused image into sub-images, and calculating step responses with respect to the edge direction in each sub-image. The mean step response is used in calculating PSF coefficients, which are applied in turn to determine an image restoration transfer function. An in-focus image is obtained by multiplying this function by the out-of-focus image in the frequency domain.

PCT International Publication WO 2004/063989, whose disclosure is incorporated herein by reference, describes an electronic imaging camera, comprising an image sensing array and an image processor. The image processor applies a deblurring function—typically in the form of a deconvolution filter (DCF)—to the signal output by the array in order to generate an output image with reduced blur. This blur reduction makes it possible to design and use camera optics with a poor inherent PSF, while restoring the electronic image generated by the sensing array to give an acceptable output image.

Low-cost color video cameras typically use a single solid-state image sensor with a multi-colored mosaic filter overlay. A mosaic filter is a mask of miniature color filter elements in which a filter element is positioned in front of each detector element of the image sensor. For example, U.S. Pat. No. 4,697,208, whose disclosure is incorporated herein by reference, describes a color image pickup device that has a solid-state image sensing element and a complementary color type mosaic filter. Any sort of image sensor with a color mosaic filter, regardless of the choice and arrangement of the colors in the mosaic, is referred to hereinbelow as a "mosaic image sensor."

The filter elements in the mosaic filter generally alternate between the primary RGB colors, or between the complementary colors cyan, magenta and yellow. One common type of color mosaic filter is called a "Bayer sensor" or "Bayer mosaic," which has the following general form (in which letters represent colors—R denotes red, G denotes green and B denotes blue):

| R | G | R | G | R | G |
| G | B | G | B | G | B |
| R | G | R | G | R | G |
| G | B | G | B | G | B |
| R | G | R | G | R | G |
| G | B | G | B | G | B |

The different color filters have respective passbands, which may overlap. The Bayer mosaic is described in U.S. Pat. No. 3,971,065, whose disclosure is incorporated herein by reference.

Processing the output of a mosaic image sensor typically involves reconstructing the full, color image by extracting three color signals (red, green and blue) from the sensor output. An image signal processor (ISP) processes the color signals in order to compute luminance (Y) and chrominance (C) values for each pixel of the output image. The ISP then outputs these values (or the corresponding R, G and B color values) in a standard video format.

The Standard Mobile Imaging Architecture (SMIA) is an open standard developed by Nokia and STMicroelectronics for use by companies making, buying or specifying miniature integrated camera modules for use in mobile applications. Information regarding this standard is available on the Internet at the SMIA-forum Web site. The main object of the standard is to make it possible to connect any SMIA-compliant sensor to any SMIA-compliant host system with matching capabilities and get a working system. The SMIA 1.0 Part 1: Functional Specification (2004) provides standardized electrical, control and image data interfaces for Bayer sensor modules, which output raw data to an image signal processor (ISP) or other processing host. Chapter 10 of the SMIA specification, which is incorporated herein by reference, describes a method for differential pulse code modulation (DPCM) that may be used to compress the image output of the sensor from ten to eight bits/pixel in order to reduce the required bandwidth in transmission between the sensor module and the host.

PCT International Publication WO 2007/054931 (published after the priority date of the present patent application), which is assigned to the assignee of the present patent application and whose disclosure is incorporated herein by reference, describes methods and devices for image enhancement in the mosaic domain A mosaic image sensor outputs stream of pixel values belonging to a plurality of input sub-images, each of which is due to light of a different, respective color that is incident on the sensor. An image restoration circuit filters the pixel values in each of the input sub-images so as to generate corresponding output sub-images with enhanced quality, such as with reduced blur. An image signal processor (ISP) then combines the output sub-images so as to generate a color video output image.

SUMMARY OF THE INVENTION

The embodiments of the present invention that are described hereinbelow are directed to improving the functionality of image enhancement devices, such as those described in the above-mentioned. PCT. International Publication WO 2007/054931. Some of these embodiments, for example, enable such devices to achieve better image restoration in varying scene conditions. Other embodiments reduce memory requirements of the processing circuits.

Although the embodiments described hereinbelow relate specifically to the context of image enhancement in the mosaic domain, the principles of the present invention are also relevant, mutatis mutandis, to other image processing applications.

There is therefore provided, in accordance with an embodiment of the present invention, a method for imaging, including:

receiving an input image including a matrix of pixels having input pixel values;

processing the input pixel values so as to detect a region of saturation in the input image;

applying a first image filtering operation to the input pixel values of at least the pixels that are outside the region of saturation, so as to generate first filtered pixel values;

applying a second image filtering operation to the input pixel values of at least the pixels that are within the region of saturation, so as to generate second filtered pixel value; and generating an enhanced output image by stitching together the first and second filtered pixel values.

In disclosed embodiments, receiving the input image includes receiving from a mosaic image sensor a stream of the input pixel values belonging to a plurality of input sub-images, each sub-image responsive to light of a different, respective color that is incident on the mosaic image sensor, and applying the first and second image filtering operations includes processing the input pixel values in each of the input sub-images so as to generate a corresponding plurality of enhanced output sub-images. Applying the second image filtering operation may include determining the second filtered pixel values for all of the sub-images based on a result of the second image filtering operation in one of the sub-images.

In some embodiments, the input image is received from an image sensor and has a blur due to a point spread function (PSF) of optics that focus light onto the image sensor, and applying the first image filtering operation includes applying a deconvolution filter (DCF), having a filter kernel determined according to the PSF, to the input pixel values, while applying the second image filtering operation includes applying a high-pass filter to the input pixel values.

In a disclosed embodiment, stitching together the first and second filtered pixel values includes assigning respective weights to at least some of the pixels in the region of saturation, and computing output pixel values in the region of saturation in the enhanced output image as a weighted sum of the first and second filtered pixel values using the respective weights. Typically, processing the input pixel values includes identifying first pixels having input pixel values in excess of a predetermined threshold as saturated pixels, and assigning the respective weights includes associating second pixels in a vicinity of the first pixels with the region of saturation, wherein the second pixels are not saturated pixels, and assigning the weights to the second pixels.

There is also provided, in accordance with an embodiment of the present invention, a method for imaging, including:

receiving from an image sensor an input image including a first number of rows of pixels having input pixel values responsive to light focused onto the image sensor by objective optics, which have a point spread function (PSF) that gives rise to an input blur of the input image;

compressing the input pixel values and storing the compressed pixel values in an input buffer including a second number of buffer lines that is less than the first number;

reading out and decompressing the stored, compressed pixel values from the input buffer so as to provide the decompressed pixel values to a deconvolution filter (DCF), which has a filter kernel determined according to the PSF; and processing the decompressed pixel values using the DCF so as to generate an output image having an output blur that is smaller than the input blur.

The second number of the buffer lines may be determined responsively to a size of the filter kernel of the DCF.

In a disclosed embodiment, the image sensor includes a mosaic image sensor, and receiving the input image includes receiving a stream of the input pixel values belonging to a plurality of input sub-images, each sub-image responsive to light of a different, respective color that is incident on the mosaic image sensor, and compressing the input pixel values includes separately compressing each of the input sub-images.

In one embodiment, compressing the input pixel values includes applying a differential pulse code modulation (DPCM) scheme to the input pixel values.

There is additionally provided, in accordance with an embodiment of the present invention, a method for imaging, including:

receiving from an image sensor an input image including a matrix of pixels having input pixel values responsive to light focused onto the image sensor by objective optics; which have a point spread function (PSF) that gives rise to an input blur of the input image;

processing the input pixel values to derive contrast statistics of the input image;

selecting a filter kernel responsively to the PSF and to the contrast statistics; and applying a deconvolution filter (DCF) using the selected filter kernel to the input pixel values in order to generate an output image having an output blur that is smaller than the input blur.

In some embodiments, the image sensor includes a mosaic image sensor, and receiving the input image includes receiving a stream of the input pixel values belonging to a plurality of input sub-images, each sub-image responsive to light of a different, respective color that is incident on the mosaic image sensor, and processing the input pixel values includes computing the contrast statistics respectively for each of the sub-images. In one embodiment, selecting The filter kernel includes choosing the filter kernel responsively to a characteristic of the contrast statistics of at least two of the sub-images, wherein the characteristic includes a difference between the contrast statistics of the at least two of the sub-images.

Additionally or alternatively, processing the input pixel values includes identifying edge pixels in the input image, and computing edge strengths over multiple ranges around the edge pixels.

There is further provided, in accordance with an embodiment of the present invention, apparatus for imaging, including:

a saturation detector, which is configured to receive an input image including a matrix of pixels having input pixel values, and to process the input pixel values so as to detect a region of saturation in the input image; and at least one filter circuit, which is configured to apply a first image filtering operation to the input pixel values of at least the pixels that are outside the region of saturation, so as to generate first filtered pixel values, and to apply a second image filtering operation to the input pixel values of at least the pixels that are within the region of saturation, so as to generate second filtered pixel value, and to generate an enhanced output image by stitching together the first and second filtered pixel values.

There is moreover provided, in accordance with an embodiment of the present invention, apparatus for imaging, including:

an image sensor, which is configured to generate an input image including a first number of rows of pixels having input pixel values responsive to light focused onto the image sensor;

objective optics, which are configured to focus the light onto the image sensor with a point spread function (PSF) that gives rise to an input blur of the input image;

an encoder, which is configured to compress the input pixel values;

an input buffer, including a second number of buffer lines that is less than the first number, which is coupled to store the compressed pixel values;

a decoder, which is coupled to read out and decompress the stored, compressed pixel values from the input buffer; and a deconvolution filter (DCF), which has a filter kernel determined according to the PSF and is coupled to receive and process the decompressed pixel values from the decoder so as to generate an output image having an output blur that is smaller than the input blur.

There is furthermore provided, in accordance with an embodiment of the present invention, apparatus for imaging, including:

an image sensor, which is configured to generate an input image including a matrix of pixels having input pixel values responsive to light focused onto the image sensor;

objective optics, which are configured to focus the light onto the image sensor with a point spread function (PSF) that gives rise to an input blur of the input image; and an image restoration circuit, which is configured to process the input pixel values to derive contrast statistics of the input image, to select a filter kernel responsively to the PSF and to the contrast statistics, and to apply a deconvolution filter (DCF) using the selected filter kernel to the input pixel values in order to generate an output image having an output blur that is smaller than the input blur.

The present invention will be more fully understood from the following detailed description of the embodiments thereof, taken together with the drawings in which:

DETAILED DESCRIPTION OF EMBODIMENTS

Overview

Figure 1:
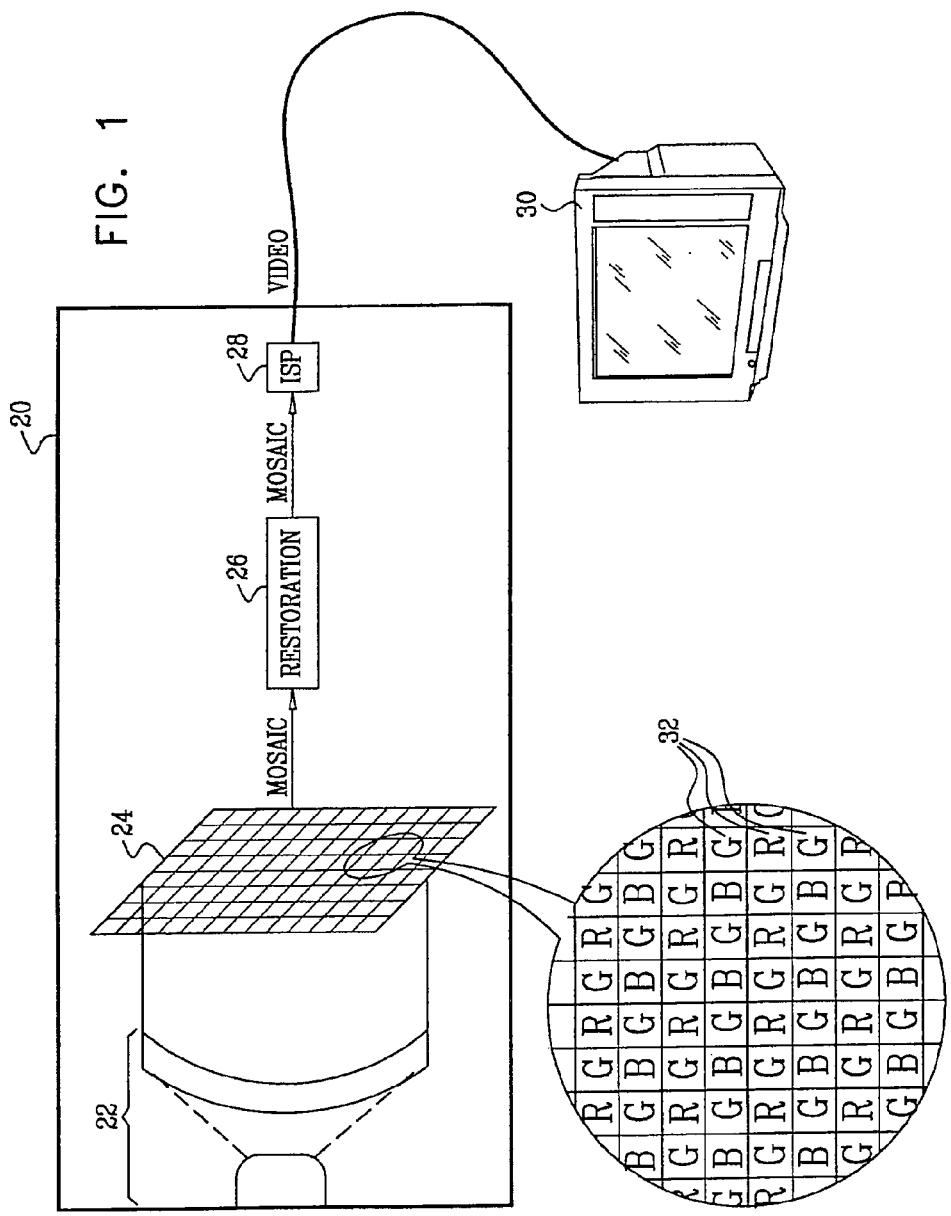
FIG. 1 is a block diagram that schematically illustrates an electronic imaging camera, in accordance with an embodiment of the present invention.

FIG. 1 is a block diagram that schematically illustrates an electronic imaging camera 20, in accordance with an embodiment of the present invention. This specific, simplified camera design is shown here by way of example, in order to clarify and concretize the principles of the present invention. These principles, however, are not limited to this design, but may rather be applied in imaging systems of other types, particularly (but not exclusively) in systems in which a sensor produces multiple sub-images of different colors, which are then combined to produce an enhanced color output image.

In camera 20, objective optics 22 focus light from a scene onto a mosaic image sensor 24. Any suitable type of image sensor, such as a CCD or CMOS image sensor, may be used in the camera. In this example, as well as in the description that follows, the sensor is assumed to have a Bayer-type mosaic filter, so that each pixel 32 in the matrix of pixels defined by the sensor is responsive to either red, green or blue light. Thus, the mosaic sensor output can be seen as comprising red, green and blue sub-images, made up of the pixel values of the corresponding sensor element. The pixel values belonging to the different sub-images are typically interleaved in the output signal according to the order of the color elements in the mosaic filter, i.e., the sensor outputs one row of RGRGRG . . . (alternating red and green filters), followed by a succeeding row of GBGBGB . . . (alternating green and blue), and so forth in alternating lines. Alternatively, the methods and circuits described hereinbelow may be used, mutatis mutandis, with other types of mosaic sensor patterns, and some aspects of these methods and circuits may be applied to other image sources and formats, as well.

Image sensor 24 outputs a stream of pixel values, which is received as the input image to a digital restoration circuit 26. Some elements of this circuit are described in detail with reference to the figures that follow, while other aspects of the circuit, which are beyond the scope of the present patent application, are described in the above-mentioned PCT International Publication WO 2007/054931. The pixel values are digitized prior to processing by circuit 26 by an analog/digital converter (not shown in the figures), which may be integrated with either sensor 24 or circuit 26 or may be a separate component. In any case, circuit 26 processes the red, green and blue input sub-images that are produced by sensor 24 in order to reduce the image blur, as described hereinbelow. Circuit 26 then outputs red, green and blue sub-images with reduced blur.

Typically, circuit 26 outputs the sub-images in the same format in which it received the sub-images from sensor 24. For example, circuit 26 may interleave the pixel values in the output sub-images to generate a single output stream, in which the pixel values have the same interleaving as the input pixel values from sensor 24. Alternatively, circuit 26 may be configured to demultiplex and output each sub-image as a separate data block or data stream.

An ISP 28 receives the deblurred red, green and blue output sub-images from restoration circuit 26 and combines the sub-images to generate a color video output image (or image sequence) in a standard video format. This output image may be displayed on a video screen 30, as well as transmitted over a communication link and/or stored in a memory.

The color video output image generated by ISP 28 typically contains both luminance and color information for each pixel in the image. This information may be encoded in terms of luminance and chrominance (Y/C, for example, or other color coordinates) or in terms of individual color values (such as RGB). By contrast, the sub-images that are processed and output by restoration circuit 26 are monochrome images, containing brightness information only with respect to the particular color that they represent. Each sub-image contains only a subset of the pixels that will appear in the color video output image, i.e., those pixels produced by elements of the image sensor that are covered by the corresponding color filter. In other words, in the example of the Bayer matrix shown in FIG. 1, the R and B sub-images will each contain one fourth of the pixels in the output image, while the G sub-image will contain the remaining half.

Typically, restoration circuit 26 and ISP 28 are embodied in one or more integrated circuit chips, which may comprise either custom or semi-custom components. Although restoration circuit 26 and ISP 28 are shown as separate functional blocks in FIG. 1, the functions of the restoration circuit and the ISP may be implemented in a single integrated circuit component. Optionally, image sensor 24 may be combined with some or all of the functions of circuit 26 and possibly also of ISP 28 on the same semiconductor substrate in a system-on-chip (SoC) or camera-on-chip design. Alternatively, some or all of the functions of restoration circuit 26 and ISP 28 may be implemented in software on a programmable processor, such as a digital signal processor. This software may be downloaded to the processor in electronic form, or it may alternatively be provided on tangible media, such as optical, magnetic or electronic memory media.

Figure 2:
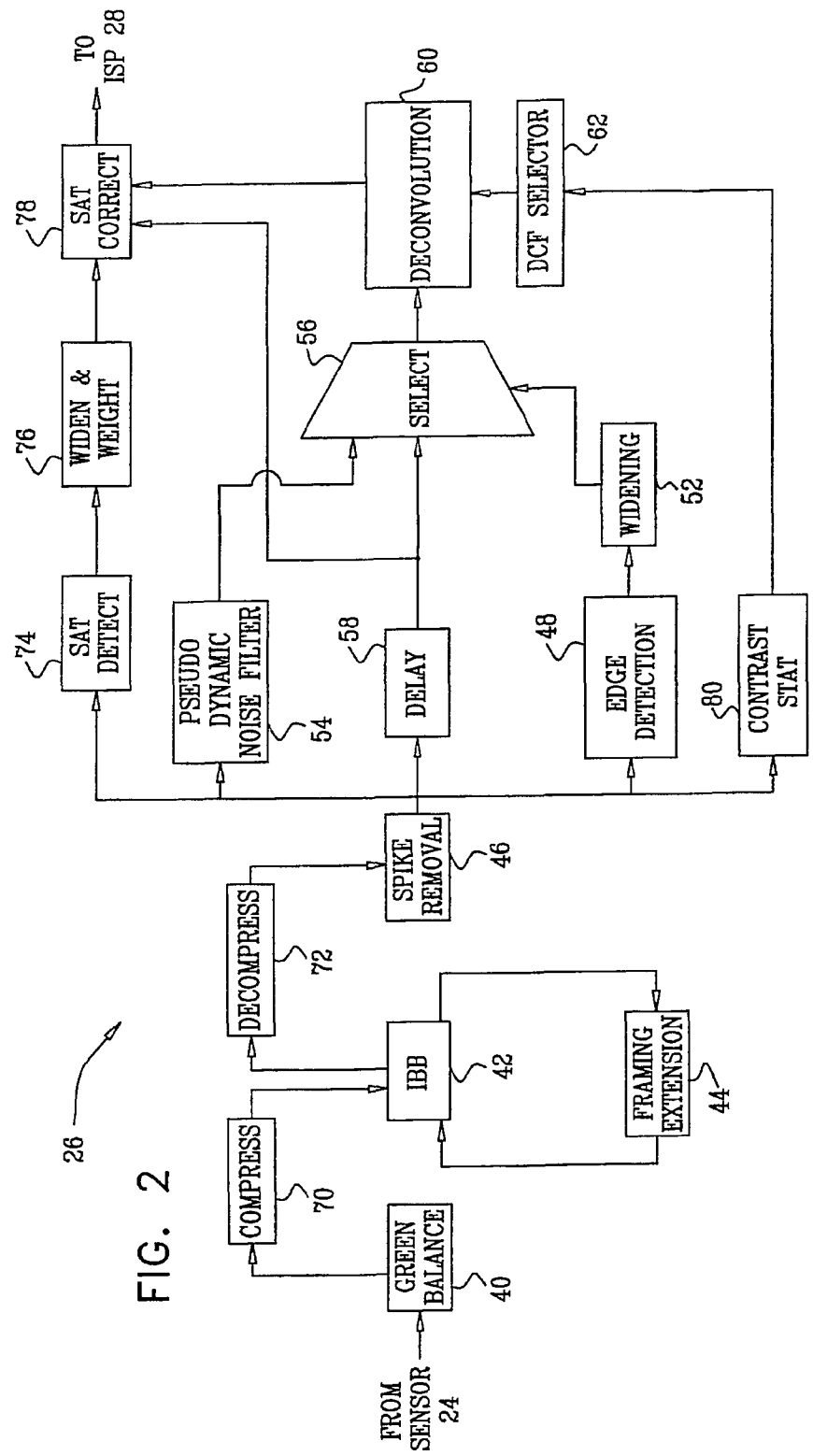
FIG. 2 is a block diagram that schematically shows details of an image restoration circuit, in accordance with an embodiment of the present invention.

FIG. 2 is a block diagram that schematically shows functional components of restoration circuit 26, in accordance with an embodiment of the present invention. Typically, these functional components are embodied together in a single custom or semi-custom integrated circuit device. Alternatively, the functions shown in FIG. 2 may be divided among a number of components, which may carry out the functions in hardware or software. In the example embodiment shown in FIG. 2, circuit 26 performs image restoration by deconvolution filtering to reduce blur of the sub-images before they are combined by ISP 28 into a single color output image. Other image restoration functions performed by circuit 26 on the sub-images include spike removal, noise filtering and saturation correction. Alternatively or additionally, circuit 26 may be configured to carry out only one or two of these restoration functions, or to carry out additional digital filtering functions in the space of the mosaic sub-images.

Optionally, a green balance unit 40 balances the Green-red (Gr) and Green-blue (Gb) pixel values for possible amplitude variations. (Gr and Gb refer to the green pixels that occur in the RGRGRG . . . rows and GBGBGB . . . rows, respectively.) The green-balanced image data are then held in an Input Blurred Bayer (IBB) buffer 42. Alternatively, sensor 24 may itself green-balance the pixel values that are output to circuit 26, or the green balancing may be performed on the data in buffer 42 or as part of the deconvolution performed subsequently by circuit 26 (which is described below).

Typically, buffer 42 contains substantially fewer lines than the number of rows in the input image, but a sufficient number of lines to provide a matrix of pixel values to the deconvolution filter, as explained hereinbelow. A framing extension unit 44 adds rows and columns of dummy pixels to the buffer to ensure correct processing of pixels at the margins of the actual image. A spike removal unit 46 identifies and modifies the values of faulty pixels, in order to prevent propagation of noise and artifacts from these pixels into the processed image. Although framing extension unit 44 is shown in FIG. 2 as writing dummy pixel values back to the buffer, the framing extension may alternatively be performed in the processing pipeline. Alternatively or additionally, spike removal unit 46 may write modified pixel values back to buffer 42 rather than operating in line as shown in the figure.

Figure 3:
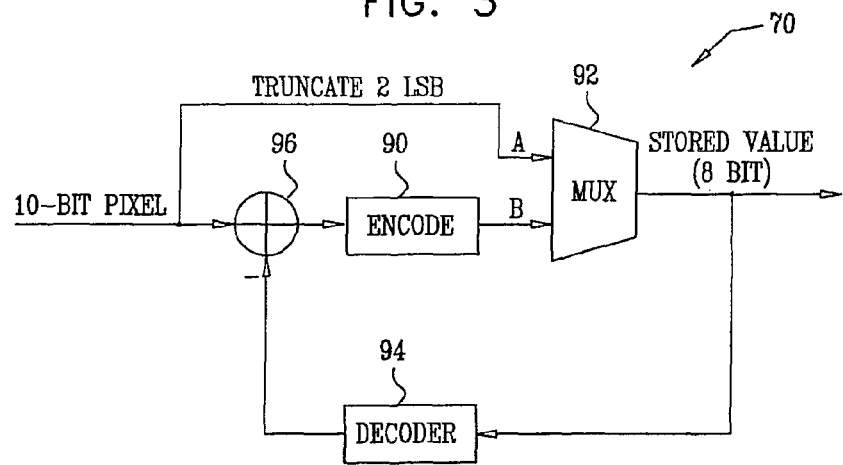
FIG. 3 is a block diagram that schematically illustrates an encoding circuit, in accordance with an embodiment of the present invention.
Figure 4:
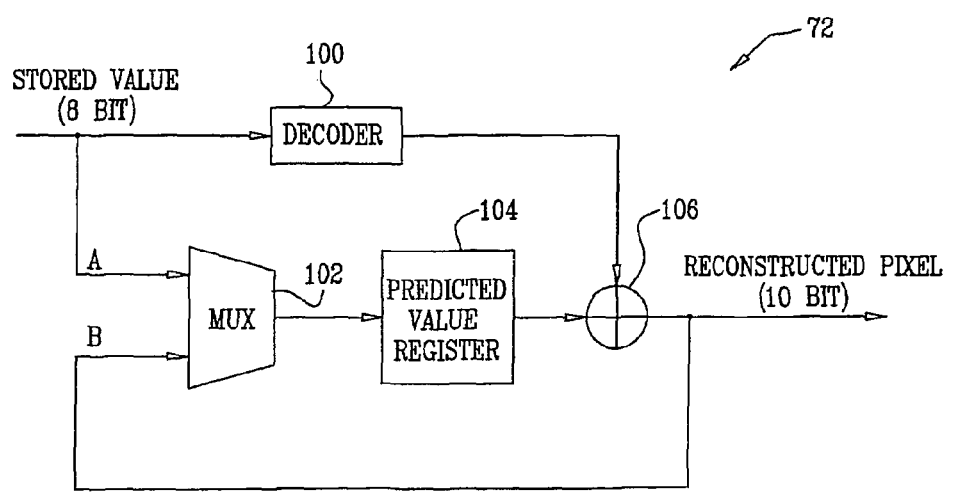
FIG. 4 is a block diagram that schematically illustrates a decoding circuit, in accordance with an embodiment of the present invention.

The pixel data in buffer 42 may optionally be compressed before storage in the buffer by an encoding circuit 70, and then decompressed by a decoding circuit 72 upon readout from the buffer. Typically, the compression is performed in a manner that is "visually lossless," meaning either that no information is lost in the course of compression and decompression, or that the information that is lost has no visible impact on the output image that is ultimately generated by ISP 28. Details of the encoding and decoding circuits are shown in FIGS. 3 and 4 and are described hereinbelow with reference to these figures.

Although encoding and decoding circuits 70 and 72 add to the overall chip area of circuit 26, they can reduce substantially (typically on the order of 20-30%) the area occupied by buffer 42: The overall savings in chip area due to buffer compression become increasingly significant as the number of rows of pixel values in the buffer increases. For example, in the above-mentioned PCT International Publication WO 2007/054931, buffer 42 is required to hold fifteen complete rows of pixel values, which conservatively amounts to 15,000 bits of data (15 rows×1000 pixels/row×10 bits/pixel). Compression of the data in the buffer to seven or eight bits/pixel thus reduces the buffer size by 3,000-4,500 bits. The reduction in buffer size becomes increasingly significant as the number of pixels in a line increases, particularly since the logic overhead for encoding and decoding is fixed for any given number of lines.

An edge detection unit 48 determines the locations of edge pixels in each sub-image, based on adaptive threshold values. A widening unit 52 then applies a morphological operation to generate an output edge mask containing the edge regions. A pseudo-dynamic noise filter 54 is applied to reduce noise in each sub-image, thus generating modified pixel values. A selector 56 selects the appropriate value of each pixel to pass to a deconvolution filter 60 based on the corresponding value of the mask provided by unit 52. The selector chooses between the modified values of non-edge pixels, taken from filter 54, and the unmodified original values of pixels, taken from buffer 42 (via spike removal unit 46), in the edge regions. The unmodified values are delayed by a delay line 58 in order to maintain proper synchronization of the pixel streams.

Deconvolution filter (DCF) 60 performs a deblurring operation on each of the sub-images individually. Filter 60 typically uses a kernel that is roughly inverse to the point spread function (PSF) of optics 22, in order to "undo" the effects of the aberrations of the optics. The effect of this sort of filter is referred to herein as "image restoration." Methods for computing deconvolution kernels of this sort are described, for example, in the above-mentioned. PCT International Publication WO 2004/063989, as well as in U.S. Patent Application Publication 2007/0236573, whose disclosure is incorporated herein by reference. Alternatively, other sorts of filter kernels may be applied by filter 60, whether for deblurring or for other image processing functions that are known in the art.

Figure 6:
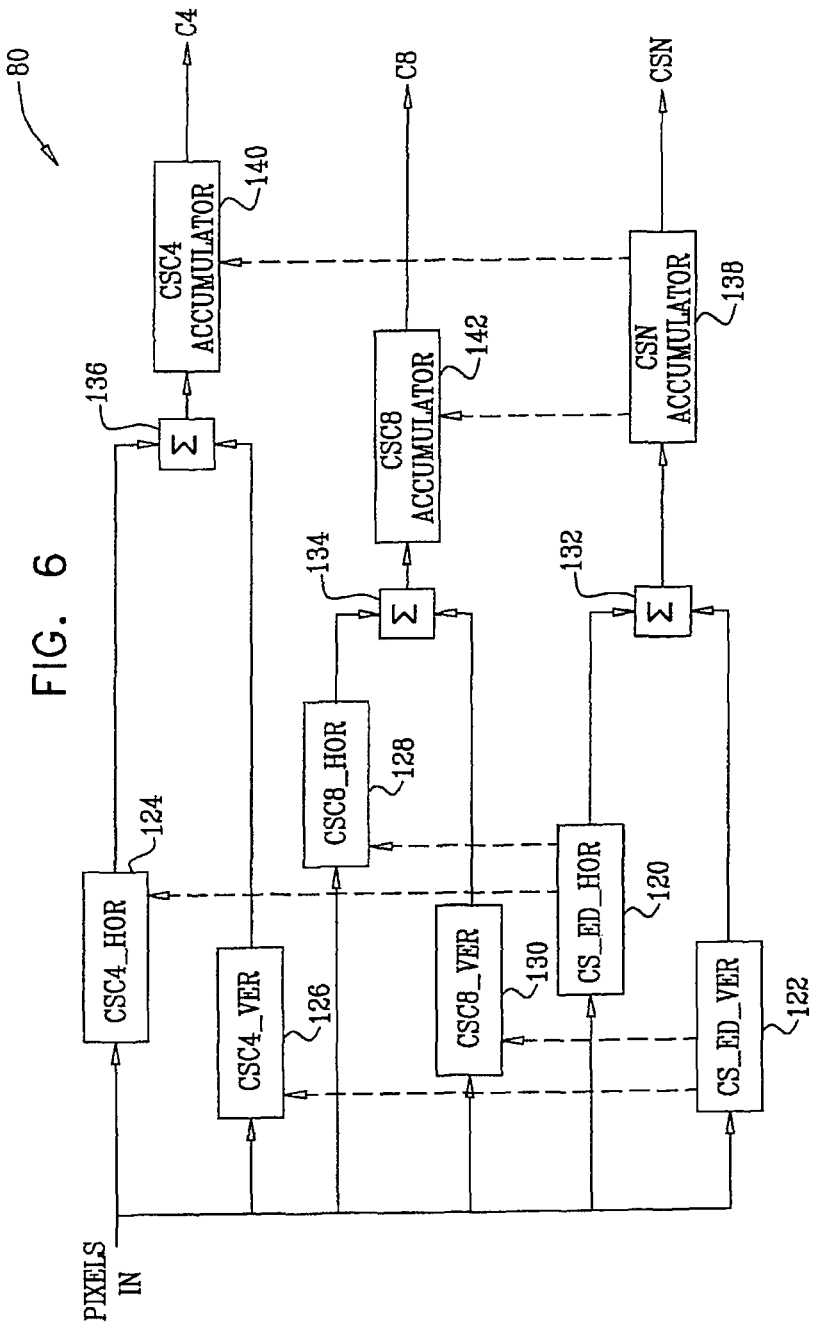
FIG. 6 is a block diagram that schematically illustrates a circuit for computing contrast statistics, in accordance with an embodiment of the present invention.

A DCF selector 62 chooses the filter kernel or kernels to be applied by filter 60. Selection of the filter kernel may be driven by various factors, including statistics of the image itself. Such statistics may be provided, for example, by a contrast statistics computation circuit 80. Details of the operation of this circuit are described hereinbelow, and features of its implementation are shown in FIG. 6.

Figure 5:
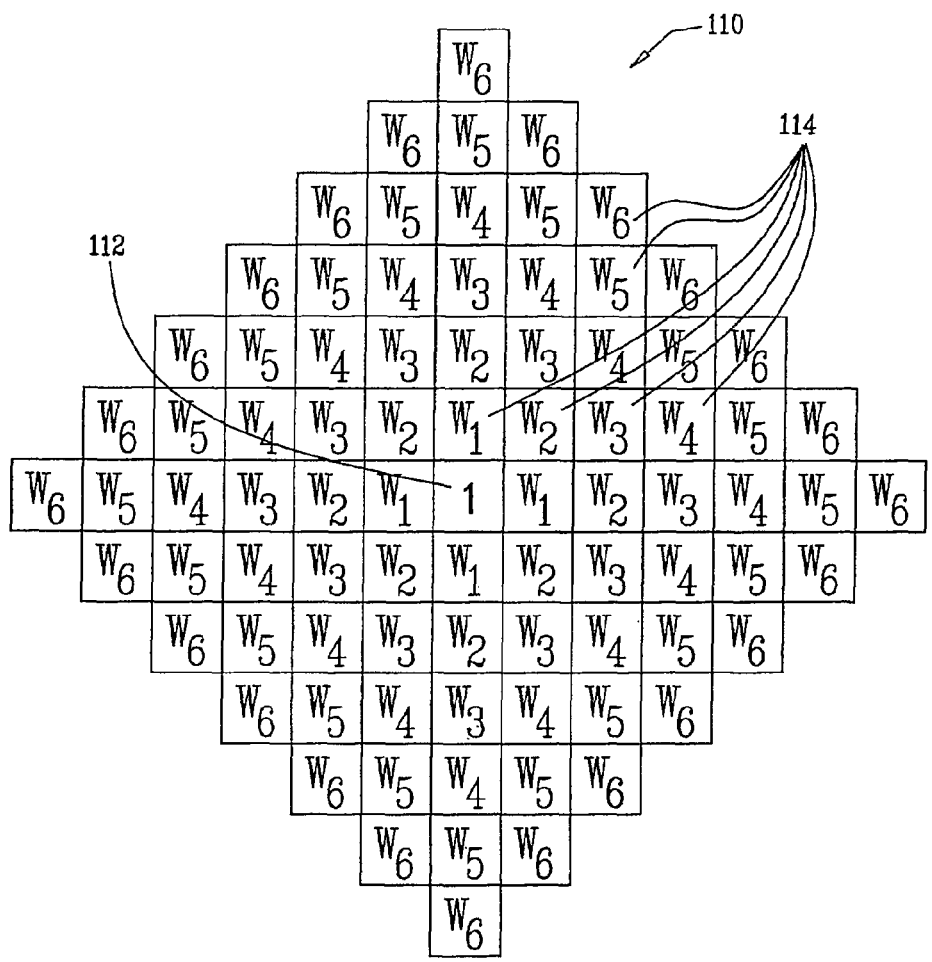
FIG. 5 is a schematic illustration of a weighting function used in processing saturated regions of an image, in accordance with an embodiment of the present invention.

Because of the limited dynamic range of image sensor 24, certain regions of the images that are output by the sensor may be saturated, with a resulting loss of information in these regions. Furthermore, nonlinear response of the image sensor near saturation can cause noticeable artifacts in the output image, and these artifacts may be particularly enhanced by filter 60. To reduce the effect of these problems, a saturation detector 74 identifies saturated regions of the input image. A widening and weighting circuit 76 provides correction weights to pixels in and around the saturated regions. A saturation correction circuit 78 applies special treatment to these pixels, and then stitches the treated pixel values together with the deblurred pixel values output by filter 60, using the correction weights, to create deblurred sub-images for output to ISP 28. Details of the treatment of saturated regions are described hereinbelow, and FIG. 5 shows a weighting function used in circuit 76 for processing such regions.

Image Buffer Compression

Reference is now made to FIGS. 3 and 4, which are block diagrams that schematically show details of encoding circuit 70 and decoding circuit 72, in accordance with an embodiment of the present invention. These circuits use a DPCM scheme, which is applied separately to each of the different sub-images in the mosaic. In other words, since each row of the input image contains interleaved pixels of two different colors (G and either R or B in each row), the circuits shown in FIGS. 3 and 4 are typically duplicated and process the pixels in alternation, operating at half the pixel clock speed. Thus, for example, one encoding circuit processes the R pixels in the first row while the other encoding circuit processes the G pixels, and so on. Alternatively, a single encoding circuit and a single decoding circuit may be used, with the addition of suitable delay buffers and multiplexers to the circuits shown in FIGS. 3 and 4 in order to separate the processing of the different sub-images.

Typically, the DPCM algorithm that is implemented by encoding circuit 70 and decoding circuit 72 predicts that each pixel of a given color will have the same value as the preceding pixel of that color. For each pixel, the encoding circuit generates an output value that encodes the difference between the pixel value and the applicable prediction. This value is stored in buffer 42. The decoding circuit decodes the stored values to recover the original input pixel values, to within a visually insignificant error. FIGS. 3 and 4 give an example of ten-to-eight bit encoding and decoding. Alternatively, by using a shorter code to encode the differences in pixel values, the encoding and decoding circuits may be configured to store seven- or six-bit values, or even fewer bits per pixel (at the risk, however, of losing image information, particularly in detailed, high-contrast images). Further alternatively, circuits 70 and 72 may apply any other suitable compression and decompression scheme.

As shown in FIG. 3, the first ten-bit pixel value in each row is truncated to eight bits by removal of the two least significant bits (LSB). For each subsequent pixel, a subtractor 96 computes the signed difference between the actual pixel value and its predicted value, and an encoder 90 transforms this difference into an eight-bit code. A multiplexer 92 selects the truncated value (input A) of the first pixel for output to buffer 42 at the beginning of each row, and subsequently selects the eight-bit code value (input B). A decoder 94 generates the ten-bit predicted value for the next pixel based on the current eight-bit code value. (The decoder is needed in order to avoid accumulation of errors due to quantization in the encoding process.)

Encoder 90 may implement any suitable ten-to-eight bit transformation. One such transformation is described in Chapter 10 of the above-mentioned SMIA Specification. This transformation losslessly encodes signed differences between zero and thirty-one (five bits) in the values of successive pixels. Larger differences, which occur rarely, are quantized so that there is some loss in resolution of the pixel values, but the loss is not visually significant. Alternatively, as noted above, differences between successive pixel values may be more severely quantized in order to reach higher compression ratios.

As shown in FIG. 4, upon readout from buffer 42, a decoder 100 in decoding circuit 72 converts the eight-bit codes back into the original ten-bit differences between the successive pixels. An adder 106 adds this difference value to the predicted value of the current pixel (based on the previous pixel), which is held in a predicted value register 104. A multiplexer 102 selects the values to store in register 104. For the first pixel in each row, the multiplexer selects the eight-bit stored value of the pixel (input A), which is padded with zeroes in the two LSB, while decoder 100 outputs a zero value for the first pixel. Subsequently, the multiplexer places the previous recovered pixel value (input B) in register 104.

Compression of the data in buffer 42 may require certain changes in the design and operation of framing extension unit 44 and spike removal unit 46, to the extent that these units are configured to operate on the compressed data in the buffer (as the framing extension unit is in FIG. 2). For vertical framing, for example, unit 44 simply copies the rows of encoded pixel values to create additional framing rows above and below the actual image. For horizontal framing, unit 44 may add codes at the beginning and end of each row corresponding to zero differences between the frame pixels and the initial and final pixels of each color in each row. Spike removal unit 46 may decode the stored pixel values, remove the spikes, and then re-encode the modified pixel values. Alternatively, in some encoding schemes, the spike removal unit may be configured to operate directly on the encoded values.

Treatment of Saturated Regions

Unlike most of the other functions of digital restoration circuit 26, which operate separately on each of the R, G and B sub-images, saturation detector 74 may analyze the values $p(i,j)$ of each pixel $(i,j)$ and its immediate neighbors in the input image, above, below, to the sides and on the diagonals, in order to determine whether the pixel is saturated. Some or all of these neighboring pixels belong to sub-images of different colors. This arrangement is useful in differentiating between actual saturation due to light conditions in the image and deviant pixel values of electronic origin. The saturation detector may determine pixel $(i,j)$ to be saturated, for example, when:

$$p(i,j) \geq SDT_1 \text{ and} \qquad \text{[equation (1)]}$$

$$\left\{ \begin{array}{l} \left( \begin{array}{l} (p(i-1, j-1) > SDT_2) \text{ and} \\ (p(i-1, j) > SDT_2) \text{ and} \\ (p(i, j-1) > SDT_2) \\ (p(i+1, j-1) > SDT_2) \text{ and} \\ (p(i+1, j) > SDT_2) \text{ and} \\ (p(i, j-1) > SDT_2) \end{array} \right) \\ \text{or} \left\{ \begin{array}{l} (p(i+1, j+1) > SDT_2) \text{ and} \\ (p(i+1, j) > SDT_2) \text{ and} \\ (p(i, j+1) > SDT_2) \\ (p(i-1, j+1) > SDT_2) \text{ and} \\ (p(i-1, j) > SDT_2) \text{ and} \\ (p(i, j+1) > SDT_2) \end{array} \right. \end{array} \right.$$

Here $SDT_1$ and $SDT_2$ are configurable saturation thresholds. The inventors have found that setting $SDT_1=SDT_2=990$ (on a ten-bit scale) gives good results.

FIG. 5 is a schematic illustration of a weighting function 110 that is applied by widening and weighting circuit 76 in processing saturated regions of an image, in accordance with an embodiment of the present invention. These weights are used by saturation correction circuit 78 in stitching together saturated and non-saturated regions of the output sub-images, as described hereinbelow. The weights take into account the effects of saturation of pixel (i,j) upon its neighbors and help to smoothly blend the saturated regions in the output sub-images with the restored, unsaturated regions.

As shown in FIG. 5, pixels 114 in the vicinity of a saturated pixel 112 receive weights $w_1, \ldots, w_6$, depending on their respective distances from the saturated pixel. Typically, the weights decrease with increasing distance from the saturated pixel. If a given pixel falls in the neighborhood of two or more saturated pixels, the weight assigned to the given pixel is determined by the nearest saturated pixel. As in saturation detector 74, widening and weighting circuit 76 assigns the weights to neighboring pixels regardless of color and division into sub-images. The weights may be computed, for example, according to the following formulas:

$$w_1 = \frac{D_1}{16}, \quad (2)$$
$$w_2 = \max\left\{0, w_1 - \frac{D_2}{16}\right\},$$
$$w_3 = \max\left\{0, w_1 - \frac{D_2}{8}\right\},$$
$$w_4 = \max\left\{0, w_3 - \frac{D_3}{16}\right\},$$
$$w_5 = \max\left\{0, w_3 - \frac{D_3}{8}\right\},$$
$$w_6 = \max\left\{0, w_5 - \frac{D_4}{16}\right\}.$$

Here $D_1, \ldots, D_4$ are configurable four-bit parameters, which may be set, for instance, to the values $D_1=15$, $D_2=4$, $D_3=2$, and $D_4=1$.

Saturation correction circuit 78 comprises a filter typically a high-pass filter. Because saturated regions cannot be restored effectively by deconvolution filter 60, saturation correction circuit 78 applies the high-pass filter to bring out details in these regions, and then stitches the high-pass regions together with the restored image using the weights assigned by widening and weighting circuit 76. The same high-pass filter may be applied to each of the color sub-images individually. Alternatively, high-pass values may be estimated using one of the sub-images (typically the green sub-image), and these values then applied to the other sub-images, so that shades of gray are substituted for the color in saturated regions of the image. This latter approach is useful particularly in avoiding color artifacts that might otherwise occur in these regions in the output image from ISP 28.

The high-pass filter may be of the form:

$$p_{sat}(i,j) = \sum_{a=-2,0,2} \sum_{b=-2,0,2} f(i+a, j+b) \cdot p(i+a, j+b) \quad (3)$$

Here $p_{sat}(i,j)$ is the pixel value after saturation treatment, while $p(i,j)$ is the input pixel value provided by delay block 58. The filter coefficients have the following values:

$$f(i+a, j+b) = \begin{cases} f_c & a=0 \text{ and } b=0 \\ f_p & a=0 \text{ or } b=0, a \neq b \\ f_f & a=\pm 2 \text{ and } b=\pm 2 \end{cases} \quad (4)$$

wherein $$f_p = -\frac{STx_p}{16}, \quad f_f = -\frac{STx_f}{16},$$

and $f_c=1-4(f_p+f_f)$. The parameters $STx_p$ and $STx_f$ are configurable, and may be set to different values for each different color when the sub-images are filtered separately. The inventors have found, however, that setting $STx_p=4$ and $STx_f=0$ for all colors gives good results.

Saturation correction circuit 78 then stitches the restored pixel values $p_{res}(i,j)$ from deconvolution filter 60 together with the high-pass values, using the pixel weights, to give the output pixel values:

$$p_{out}(i,j) = p_{res}(i,j) + \alpha_s \cdot w(i,j) \cdot (p_{sat}(i,j) - p_{res}(i,j)) \quad (5)$$

Here $\alpha_s$ is a configurable global parameter that defines the impact of the saturation treatment in the output image. The inventors have found that setting $\alpha_s=1$ gives good results.

In the alternative case, as noted above, only the green sub-image is subject to the high-pass filtering expressed by equation (3). For each red and each blue pixel, a high-pass value is estimated based on the values of the surrounding green pixels: $p_{sat\_a}$ above the current red or blue pixel, $p_{sat\_b}$ to the left, $p_{sat\_c}$ to the right, and $p_{sat\_d}$ below. The estimated high-pass value for the red or blue pixel is given by:

$$\tilde{p}_{gr\_sat} = \begin{cases} \dfrac{P_{sat\_a} + P_{sat\_c}}{2}, & |P_{sat\_a} - P_{sat\_c}| < |P_{sat\_b} - P_{sat\_d}| \\ \dfrac{P_{sat\_b} + P_{sat\_d}}{2}, & \text{else} \end{cases} \quad (6)$$

The stitching provided by equation (5) now becomes:

$$p_{out}(i,j) = p_{res}(i,j) + \alpha_s \cdot w(i,j) \cdot (\tilde{p}_{sat}(i,j) - p_{res}(i,j)) \quad (7)$$

wherein $\tilde{p}_{sat}(i,j) = p_{sat}$ for green pixels, and $\tilde{p}_{sat}(i,j) = \tilde{p}_{gr\_sat}$ for red and blue pixels. This approach for the most part eliminates color information from saturated regions (since the color of such regions is typically washed out anyway) in favor of presenting faithfully whatever luminance information is available.

Although the embodiment described above uses two separate filters—deconvolution filter 60 and the high-pass filter in circuit 78—to filter the non-saturated and saturated regions of the image, the filtering and blending operations may alternatively be performed by a single filter with variable coefficients. The coefficients may be adjusted on the fly for each pixel, for example, based on the output of saturation detector 74, in order to give the desired result, as expressed by equation (5).

Contrast Statistics

As noted earlier, DCF selector 62 may choose different filter kernels to load into deconvolution filter 60, depending on image conditions. Different kernels may be optimized, for example, for different object distances and/or different lighting conditions in the scene imaged by camera 20. Kernels may be selected manually, based on input by a user of the camera to the DCF selector, or under instructions from ISP 28. Alternatively or additionally, kernel selection may be driven by statistics provided by contrast statistics computation circuit 80. The statistics are generally indicative of the strength and scale of edge information and can provide information about object distance based on properties of the optical design.

FIG. 6 is a block diagram that schematically shows details of contrast statistics computation circuit 80, in accordance with an embodiment of the present invention. Circuit 80 computes a number of statistical measures of the differences between pixel values in the same sub-image (of the same color) over various ranges, i.e., differences between p(i,j) and p(i±n,j) and between p(i,j) and p(i,j±n), for n=2, 4 and 8. The contrast statistics for n=2 reflect the contrast measured at the Nyquist frequency of image sensor 24. The number of edge pixels found at this frequency is referred to as CSN. The contrast statistics for n=4 and n=8 are referred to respectively as C4 and C8. Circuit 80 may be configured to collect contrast statistics for the green sub-image alone or, alternatively, for two or all three of the color sub-images.

Horizontal and vertical edge detection blocks 120 and 122 identify the locations of horizontal and vertical edges, respectively, with Nyquist resolution. Any suitable edge detection algorithm may be used for this purpose. One method is to identify p(i,j) as a horizontal edge pixel if:

$$d_{x\_null} - \max(d_{x\_min}, d_{x\_plus}) > CS\_edge\_threshold \quad (8)$$

wherein the terms of the formula are defined as follows:

$$d_{x\_null} = p(i,j+2) - p(i,j-2)$$

$$d_{x\_min} = p(i,j-2) - p(i,j-6)$$

$$d_{x\_plus} = p(i,j+6) - p(i,j+2) \quad (9)$$

and CS_edge_threshold is a configurable parameter, which may be calibrated and set heuristically. Vertical edge pixels are identified analogously. Each of blocks 120 and 122 counts the number of horizontal or vertical edge pixels that are found in this manner. The respective counts are summed by an adder 132 and stored by a CSN accumulator 138.

For each horizontal and vertical edge pixel, horizontal and vertical edge strength computation blocks 124 and 126 respectively compute the edge strength for n=4, while horizontal and vertical edge strength computation blocks 128 and 130 compute the edge strength for n=8. The edge strength is an indicator of relative edge contrast, which may be given in each case, for example, by $$\frac{|p(i, j-n) - p(i, j+n)|}{p(i, j-n) + p(i, j+n)}$$

for horizontal edge pixels and $$\frac{|p(i-n, j) - p(i+n, j)|}{p(i-n, j) + p(i+n, j)}$$

for vertical edge pixels. The results for n=4 are summed by an adder 136 and output by a CSC4 accumulator 140, which divides the summed edge strengths by the sum of the counts of the horizontal and vertical edge pixels mentioned above. For n=8, these functions are performed by an adder 134 and a CSC8 accumulator 142. The sums of these quotients over all of the edge pixels give the following statistical values at the outputs of accumulators 140 and 142:

$$CSC_n = \frac{\sum\limits_{horiz.\,edge\,pixels} \left(\frac{|p(i, j-n) - p(i, j+n)|}{p(i, j-n) + p(i, j+n)}\right) + \sum\limits_{vert.\,edge\,pixels} \left(\frac{|p(i-n, j) - p(i+n, j)|}{p(i-n, j) + p(i+n, j)}\right)}{\sum\limits_{horiz.\,edge\,pixels} + \sum\limits_{vert.\,edge\,pixels}} \quad \text{[equation (10)]}$$

In order to reduce the computational complexity required in circuit 80 for computing equation (10), the denominator terms, such as p(i,j−n)+p(i,j+n), may be approximated by rounding to the nearest power of 2. For example, each sum may be rounded upward. As a result, the division operations can be replaced by simple shifts. This sort of implementation is described in greater detail in the above-mentioned U.S. Provisional Patent Application 60/928,254. Since the calculation is statistical, no correction of the individual operands is required due to the rounding, but consistently rounding the denominators upward will reduce the overall result of equation (10) by about 25%. This reduction factor may be taken into account by DCF selector 62 in making the choice of kernel. Alternatively or additionally, division by the actual CSN value may performed externally (by the ISP or another control mechanism, for example).

The different contrast statistics (CSN, C4 and C8) give an indication of the strength and range of intensity variations in the image. DCF selector 62 may use these contrast statistics in various ways. For example, the DCF selector may decide that the main object seen in the image captured by camera 20 is close to lens 22, and may therefore invoke a "macro" DCF kernel, if:

$$mc\_decision = (C4R < mcth\_red * C8R) \,\&\&$$
$$(CSN\_R > csmin\_r) + (C4G < mcth\_green * C8G) \,\&\&$$
$$(CSN\_G > csmin\_g) + (C4B < mcth\_blue * C8B) \,\&\&$$
$$(CSN\_B > csmin\_b) \geq 2 \quad (11)$$

wherein the contrast statistics CSN, C4 end C8 are computed separately for each color (R, G and B), and mcth_red, mcth_green, mcth_blue, csmin_r, csmin_g, csmin_b are threshold values, which may be determined heuristically. Equation (11) means that the macro kernel is used if the threshold conditions in the equation are satisfied for at least two of the three color sub-images. These conditions indicate that although the number of edges is sufficient to characterize a valid image (CSN greater than a minimal value), the short-range edge slopes (represented by C4) are smaller than the longer-range edge slopes (represented by C8), meaning that the edges are largely blurred. A different sort of result could indicate to the DCF selector that the object is very far from lens 22, so that an "infinity" DCF kernel should be used.

Additionally or alternatively, DCF selector 62 may compare the contrast statistics for different colors. The inventors have found, for example, that for some lens systems, the red contrast statistics (i.e., C8R/C4R) tend to be stronger, relative to the green and blue contrast statistics, when the object imaged by camera 20 is far from lens 22. Therefore, the DCF selector may use the relative strength of the red contrast statistics in deciding whether to use the macro or the infinity DCF kernel, or some other kernel in between.

As explained earlier, the techniques described above have been developed by the inventors particularly for processing sub-images in the mosaic domain, using the sort of processing architecture that is shown in FIG. 1. The principles embodied in these techniques, however, may similarly be applied in processing of complete color or monochrome images, whether in the context of an image restoration circuit, such as circuit 26, or in an ISP, host computer, or other image processing component.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for imaging, comprising:
receiving an input image comprising a matrix of pixels having input pixel values;
processing the input pixel values to detect a region of saturation in the input image;
applying a first image filtering operation to at least a subset of the input pixel values to generate first filtered pixel values, wherein the first filtered pixel values include a restored pixel value for a particular pixel within the region of saturation;
applying a second image filtering operation to the input pixel values of at least the pixels that are within the region of saturation, to generate second filtered pixel values, wherein the second filtered pixel values include a filtered pixel value for the particular pixel; and
generating an enhanced output image by stitching together the first and second filtered pixel values, wherein the enhanced output image includes an output pixel value for the particular pixel that is derived based at least in part upon the restored pixel value and the filtered pixel value for the particular pixel.

2. The method according to claim 1, wherein receiving the input image comprises receiving from a mosaic image sensor a stream of the input pixel values belonging to a plurality of input sub-images, each input sub-image responsive to light of a different, respective color that is incident on the mosaic image sensor, and
wherein applying the first and second image filtering operations comprises processing the input pixel values in each of the input sub-images to generate a corresponding plurality of enhanced output sub-images.

3. The method according to claim 2, wherein applying the second image filtering operation comprises determining the second filtered pixel values for all of the sub-images based on a result of the second image filtering operation in one of the sub-images.

4. The method according to claim 1, wherein the input image is received from an image sensor and has a blur due to a point spread function (PSF) of optics that focus light onto the image sensor, and wherein applying the first image filtering operation comprises applying a deconvolution filter (DCF), having a filter kernel determined according to the PSF, to at least a subset of the input pixel values.

5. The method according to claim 4, wherein applying the second image filtering operation comprises applying a high-pass filter to the input pixel values of at least the pixels that are within the region of saturation.

6. The method according to claim 1, wherein stitching together the first and second filtered pixel values comprises assigning respective weights to at least some of the pixels in the region of saturation, and computing output pixel values for pixels in the region of saturation in the enhanced output image as a weighted sum of the first and second filtered pixel values using the respective weights.

7. The method according to claim 6, wherein processing the input pixel values comprises identifying first pixels having input pixel values in excess of a predetermined threshold as saturated pixels, and wherein assigning the respective weights comprises associating second pixels in a vicinity of the first pixels with the region of saturation, wherein the second pixels are not saturated pixels, and assigning the weights to the second pixels.

8. A method for imaging, comprising:
receiving an input image comprising a matrix of pixels having input pixel values responsive to light focused onto an image sensor by objective optics, which have a point spread function (PSF) that gives rise to an input blur in the input image;
processing the input pixel values to derive contrast statistics for the input image, wherein the contrast statistics indicate a strength and scale of edges in the input image, and wherein processing the input pixel values comprises identifying edge pixels in the input image, and computing edge strengths over multiple ranges around the edge pixels;
selecting a filter kernel based at least in part upon the PSF and the contrast statistics, wherein selecting the filter kernel comprises:
deriving, based at least in part upon the contrast statistics, an indication of how far an object in the input image was from the objective optics when the input image was captured; and
selecting the filter kernel based at least in part upon this indication; and
applying a deconvolution filter (DCF) having the selected filter kernel to the input pixel values in order to generate an output image having an output blur that is smaller than the input blur.

9. The method according to claim 8, wherein the image sensor comprises a mosaic image sensor, and wherein receiving the input image comprises receiving a stream of the input pixel values belonging to a plurality of input sub-images, each input sub-image responsive to light of a different, respective color that is incident on the mosaic image sensor, and
wherein processing the input pixel values comprises computing the contrast statistics respectively for each of the input sub-images.

10. The method according to claim 9, wherein selecting the filter kernel comprises choosing the filter kernel based at least in part upon a characteristic of the contrast statistics of at least two of the input sub-images.

11. The method according to claim 10, wherein the characteristic comprises a difference between the contrast statistics of the at least two of the input sub-images.

12. Apparatus for imaging, comprising:
a saturation detector, which is configured to receive an input image comprising a matrix of pixels having input pixel values, and to process the input pixel values to detect a region of saturation in the input image; and one or more filter circuits configured to apply a first image filtering operation to at least a subset of the input pixel values to generate first filtered pixel values, wherein the first filtered pixel values include a restored pixel value for a particular pixel within the region of saturation, and to apply a second image filtering operation to the input pixel values of at least the pixels that are within the region of saturation, to generate second filtered pixel values, wherein the second filtered pixel values include a filtered pixel value for the particular pixel, and to generate an enhanced output image by stitching together the first and second filtered pixel values, wherein the enhanced output image includes an output pixel value for the particular pixel that is derived based at least in part upon the restored pixel value and the filtered pixel value for the particular pixel.

13. The apparatus according to claim 12, further comprising:
a mosaic image sensor, which is configured to provide the input image as a stream of the input pixel values belonging to a plurality of input sub-images, each input sub-image responsive to light of a different, respective color that is incident on the mosaic image sensor,
wherein the one or more filter circuits is configured to process the input pixel values in each of the input sub-images to generate a corresponding plurality of enhanced output sub-images; and
an image signal processor (ISP), which is coupled to receive and process the plurality of enhanced output sub-images to generate a color video output image.

14. The apparatus according to claim 13, wherein the one or more filter circuits is configured to compute the second filtered pixel values for all of the sub-images based on a result of the second image filtering operation in one of the sub-images.

15. The apparatus according to claim 12,
wherein the input image has a blur that arises due to a point spread function (PSF) of a set of objective optics used to capture the input image; and
wherein the first image filtering operation comprises applying a deconvolution filter (DCF), having a filter kernel determined according to the PSF, to at least a subset of the input pixel values.

16. The apparatus according to claim 15, wherein the second image filtering operation comprises applying a high-pass filter to the input pixel values of at least the pixels that are within the region of saturation.

17. The apparatus according to claim 12, further comprising a weighting circuit, which is configured to assign respective weights to at least some of the pixels in the region of saturation, wherein the one or more filter circuits is configured to compute output pixel values for pixels in the region of saturation in the enhanced output image as a weighted sum of the first and second filtered pixel values using the respective weights.

18. The apparatus according to claim 17, wherein the saturation detector is configured to identify first pixels having input pixel values in excess of a predetermined threshold as saturated pixels, and wherein the weighting circuit is configured to associate second pixels in a vicinity of the first pixels with the region of saturation, wherein the second pixels are not saturated pixels, and to assign the weights to the second pixels.

19. Apparatus for imaging, comprising:
an image restoration circuit, which is configured to receive an input image comprising a matrix of pixels having input pixel values, the input image having an input blur that arises due to a point spread function (PSF) of a set of objective optics used to capture the input image, the image restoration circuit further configured to process the input pixel values to derive contrast statistics for the input image, wherein the contrast statistics indicate a strength and scale of edges in the input image, to select a filter kernel based at least in part upon the PSF and the contrast statistics, and to apply a deconvolution filter (DCF) having the selected filter kernel to the input pixel values in order to generate an output image having an output blur that is smaller than the input blur;
wherein the image restoration circuit is configured to process the input pixel values by at least:
identifying edge pixels in the input image, and computing edge strengths over multiple ranges around the edge pixels in order to derive the contrast statistics; and
wherein the image restoration circuit is configured to select the filter kernel by at least:
deriving, based at least in part upon the contrast statistics, an indication of how far an object in the input image was from the objective optics when the input image was captured; and
selecting the filter kernel based at least in part upon this indication.

20. The apparatus according to claim 19, wherein the input image is captured by a mosaic image sensor, which is configured to output a stream of the input pixel values belonging to a plurality of input sub-images, each input sub-image responsive to light of a different, respective color that is incident on the mosaic image sensor, and
wherein the image restoration circuit is configured to compute the contrast statistics respectively for each of the input sub-images.

21. The apparatus according to claim 20, wherein the image restoration circuit is configured to choose the filter kernel based at least in part upon a characteristic of the contrast statistics of at least two of the input sub-images.

22. The apparatus according to claim 21, wherein the characteristic comprises a difference between the contrast statistics of the at least two of the input sub-images.

23. A method for imaging, comprising:
receiving from an image sensor an input image comprising a matrix of pixels having input pixel values responsive to light focused onto the image sensor by objective optics, which have a point spread function (PSF) that gives rise to an input blur in the input image;
processing the input pixel values to derive contrast statistics for the input image, wherein the contrast statistics indicate a strength and scale of edges in the input image;
selecting a filter kernel responsively to the PSF and the contrast statistics; and
applying a deconvolution filter (DCF) having the selected filter kernel to the input pixel values in order to generate an output image having an output blur that is smaller than the input blur;
wherein processing the input pixel values comprises:
determining a difference in pixel values between a particular pixel and a first pixel that is at a first distance in a first direction from the particular pixel; and
determining a difference in pixel values between the particular pixel and a second pixel that is at a second distance in the first direction from the particular pixel, wherein the second distance is different from the first distance.

24. Apparatus for imaging, comprising:
an image sensor, which is configured to provide an input image comprising a matrix of pixels having input pixel values responsive to light focused onto the image sensor;
objective optics, which are configured to focus light onto the image sensor with a point spread function (PSF) that gives rise to an input blur in the input image; and
an image restoration circuit, which is configured to process the input pixel values to derive contrast statistics for the input image, wherein the contrast statistics indicate a strength and scale of edges in the input image, to select a filter kernel responsively to the PSF and the contrast statistics, and to apply a deconvolution filter (DCF) having the selected filter kernel to the input pixel values in order to generate an output image having an output blur that is smaller than the input blur;
wherein the image restoration circuit is configured to process the input pixel values by at least:
determining a difference in pixel values between a particular pixel and a first pixel that is at a first distance in a first direction from the particular pixel; and
determining a difference in pixel values between the particular pixel and a second pixel that is at a second distance in the first direction from the particular pixel, wherein the second distance is different from the first distance.

25. The method according to claim 1, wherein the particular pixel is within a vicinity of a saturated pixel, wherein the particular pixel is assigned a particular weight, and wherein the output pixel value for the particular pixel is derived based at least in part upon the restored pixel value, the filtered pixel value for the particular pixel, and the particular weight.

26. The method according to claim 25, wherein the particular weight is assigned to the particular pixel based at least in part upon how far the particular pixel is from the saturated pixel.

27. The apparatus according to claim 12, wherein the particular pixel is within a vicinity of a saturated pixel, wherein the particular pixel is assigned a particular weight, and wherein the output pixel value for the particular pixel is derived based at least in part upon the restored pixel value, the filtered pixel value for the particular pixel, and the particular weight.

28. The apparatus according to claim 27, wherein the particular weight is assigned to the particular pixel based at least in part upon how far the particular pixel is from the saturated pixel.

29. A method for imaging, comprising:
receiving an input image comprising a matrix of pixels having input pixel values responsive to light focused onto an image sensor by objective optics, which have a point spread function (PSF) that gives rise to an input blur in the input image;
processing the input pixel values to derive contrast statistics for the input image, wherein the contrast statistics indicate a strength and scale of edges in the input image;
selecting a filter kernel based at least in part upon the PSF and the contrast statistics; and
applying a deconvolution filter (DCF) having the selected filter kernel to the input pixel values in order to generate an output image having an output blur that is smaller than the input blur;
wherein processing the input pixel values to derive the contrast statistics comprises:
identifying an edge pixel in the input image;
determining a difference in pixel values between a first pixel on a first side of the edge pixel and a second pixel on a second side of the edge pixel, wherein the first and second pixels are separated by a first distance; and
determining a difference in pixel values between a third pixel on the first side of the edge pixel and a fourth pixel on the second side of the edge pixel, wherein the third and fourth pixels are separated by a second distance which is different from the first distance.

30. Apparatus for imaging, comprising:
an image restoration circuit, which is configured to receive an input image comprising a matrix of pixels having input pixel values, the input image having an input blur that arises due to a point spread function (PSF) of a set of objective optics used to capture the input image, the image restoration circuit further configured to process the input pixel values to derive contrast statistics for the input image, wherein the contrast statistics indicate a strength and scale of edges in the input image, to select a filter kernel based at least in part upon the PSF and the contrast statistics, and to apply a deconvolution filter (DCF) having the selected filter kernel to the input pixel values in order to generate an output image having an output blur that is smaller than the input blur;
wherein the image restoration circuit is configured to process the input pixel values to derive the contrast statistics by at least:
identifying an edge pixel in the input image;
determining a difference in pixel values between a first pixel on a first side of the edge pixel and a second pixel on a second side of the edge pixel, wherein the first and second pixels are separated by a first distance; and
determining a difference in pixel values between a third pixel on the first side of the edge pixel and a fourth pixel on the second side of the edge pixel, wherein the third and fourth pixels are separated by a second distance which is different from the first distance.

* * * * *